Oct. 14, 1969    R. P. ERNEST ET AL    3,472,310
SHELL MOLD AND PROCESS FOR SHELL MOLDING
Filed April 26, 1967
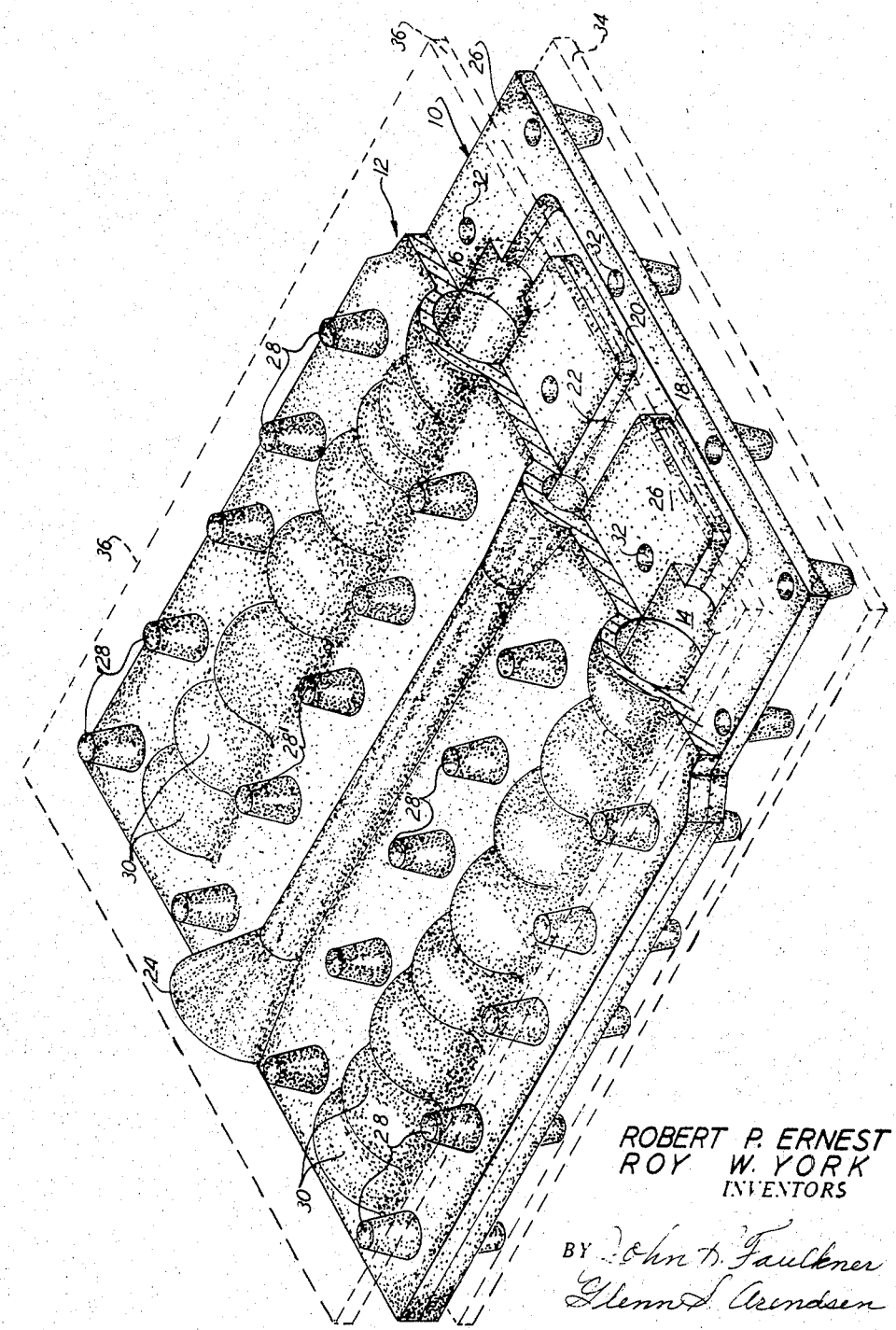
ROBERT P. ERNEST
ROY W. YORK
INVENTORS
BY John D. Faulkner
Glenn S. Arendsen
ATTORNEYS

United States Patent Office 3,472,310
Patented Oct. 14, 1969

3,472,310
SHELL MOLD AND PROCESS FOR
SHELL MOLDING
Robert P. Ernest, Dearborn Heights, and Roy W. York, Grosse Pointe Park, Mich., assignors to Ford Motor Company, Dearborn, Mich., a corporation of Delaware
Filed Apr. 26, 1967, Ser. No. 633,962
Int. Cl. B22c 9/02, 9/12
U.S. Cl. 164—137    8 Claims

ABSTRACT OF THE DISCLOSURE

Pins projecting from the exterior of shell halves bonded together to make this shell mold permit applying a large uniform clamping pressure to the contact surfaces of the halves during bonding and pouring. The pins are made of molding sand and are formed during the operation forming the shell halves. Each pin projects slightly higher than the highest protrusion of the shell half and the pin ends are substantially coplanar. The planes of the pin ends of both halves preferably are substantially parallel to the contact surfaces of the shell halves.

SUMMARY OF THE INVENTION

Shell molds are used widely for casting engine crankshafts and camshafts rapidly and efficiently. Each mold is made from shell portions formed by contacting molding material such as a sand and binder mixture with a heated pattern. The heated pattern cures the molding material in contact with and in the immediate vicinity of the pattern to form a thin walled structure having part of the cavity for making the desired casting formed on its interior and roughly conforming to the shape of the cavity on its exterior. After completely curing the shell portion it is lifted off the pattern and assembled into a mold by attaching the various portions together. The mold then is placed in a flask and the space surrounding the mold is filled with metal shot to provide sufficient strength for the mold during the casting operation.

Conventional practice has been to form shell portions in duplicate halves and attach the halves to each other by clips around the outside edges or by bonding. Bonding has become the preferred attaching means, but because of the uneven exterior surfaces of the portions, difficulties are encountered in applying sufficient clamping force to the mating surfaces of the portions to insure adequate bonding.

Complicated arrangements in which springs bear on the exterior of the portions have been used with some success, but generally these do not provide uniform forces because of the differences in spring deflection. In some cases, pads were formed on the exteriors of the portions to equalize the clamping force, but this technique is unsuccessful mainly because of the rough nature of the exterior surface. Furthermore, the pads were unusable where different components (e.g., both crankshafts and camshafts) were being produced on the same line, which usually is the case in modern manufacturing.

This invention provides a shell mold greatly simplifying mold assembly and use and producing a better molded product. A plurality of projecting elements are formed on the exterior of each portion making up the shell mold of this invention in a manner such that the elements serve as force receiving elements and are sufficiently robust to transmit a substantial clamping force to the contact surfaces of the portions. A sufficient number of projecting elements are included to distribute that clamping force into a substantially uniform pressure at the contact surfaces. The elements preferably project slightly higher than the highest protrusion of the mold portion and are formed integrally with the shell portion from molding material.

During processing, bonding material is applied to the contact surface of one of the shell portions. Contact surfaces then are placed against each other and members having surfaces conforming to the locus of the element ends bear on the elements to produce a clamping force. The elements distribute the clamping force into a substantially uniform pressure at the contact surfaces, thereby producing excellent bonds. In addition, the high forces that can be applied through the elements, tend to straighten minor deflections in the portions to decrease the flash formed on the molded part, thereby decreasing subsequent processing, and increase product quality. Clamping forces sufficient to hold the shell mold together during pouring also can be applied through the elements, thereby reducing the amount of granular material needed to back up the mold during the casting operation.

The projecting elements preferably are pins that have substantially coplanar ends, which can be accomplished by contacting the pin ends with a substantially planar surface prior to completely curing the shell portions. These pins are located at the edges of the shell portion exterior and at appropriate positions in the center area. By projecting the pins slightly higher than the highest protrusion of the exterior of the shell portion, rendering the ends of the pins substantially coplanar can be carried out without disturbing the mold cavity.

BRIEF DEESCRIPTION OF THE DRAWING

The drawing is a perspective view of an assembled shell mold for making engine crankshafts showing pins positioned along the edges and in the central area of the shell halves. Part of the upper shell half is broken away to reveal the mold cavities and the contact surface of the lower shell half. Shown in phantom are the members used to apply a clamping force to the shell halves.

DETAILED DESCRIPTION

Referring to the drawing, a typical shell mold of this invention is made from identical shell halves represented by numerals 10 and 12. The shell halves are formed of a mixture of molding sand and a thermosetting binder such as a phenol formaldehyde resin. Formed on each side of the interior or face of the shell half is a cavity represented by the numerals 14 and 16 conforming to one-half of the crankshaft that will be cast in the completed shell mold. Feeder passages 18 and 20 connect cavities 14 and 16 with a filler passage 22 passing vertically through the center of each half and terminating at the top in a sprue 24.

Surrounding the cavities and passages are the contact surfaces of the shell halves with the contact surface of shell half 10 represented in the drawing by numeral 26. A plurality of projecting pins 28 are formed along the edges of the exterior of the shell halves with additional pins 28' in the center area. The pins project slightly higher than the highest protrusion 30 of the shell half, and are formed from the molding sand at the time the shell half is formed by equipping the pattern with corresponding projections that leave holes 32 when the shell half is removed from the pattern.

Pins 28 are sufficiently strong to transmit clamping forces of at least one p.s.i. and as high as several p.s.i. to the contact surfaces. In molds made of sand and binder used for metal founding, pins tapering to ends of about one inch in diameter have been found useful. In addition, the pins must be in sufficient numbers to distribute the clamping force across the contact surfaces. As a guide, mold halves for casting two engine crankshafts have used 26 pins per half with success.

Generally, each shell half is prepared by contacting an excess of molding sand with a heated pattern. Pattern temperature generally is about 500° F. and heat from the pattern partially cures the molding sand in its immediate vicinity into a thin walled form. After an invesment time of about 20 seconds, excess sand is taken away and the pin ends are contacted by a substantially flat member that is substantially parallel to the plane of the contact surface of the shell half. This levels the pin ends so the locus of the ends defines a substantially coplanar surface, the plane of which is substantially parallel to the plane of the face of the shell half.

The shell half then passes through a furnace that cooperates with the heat from the pattern to complete the cure of the molding sand. At the end of the furnace, the shell half is dropped off the pattern and lands on the pin ends on a table where it awaits its sister shell half.

Bonding material in liquid or paste form, for example, then is applied to at least one of the shell half contact surfaces by any conventional method such as brushing or extruding the bonding material from a gun. The faces of the shell halves are located adjacent each other and the shell halves are placed in a clamping assembly having large flat surfaces represented in the drawings by numerals 34 and 36 that correspond in size to the planes subtended by pins 28 and 28'. The clamping assembly applies a clamping force to the ends of the pins and the pins distribute that clamping force into a uniform pressure at the contact surfaces. Preferably, the clamping force is normal to the faces of the shell halves and the pins are sufficiently robust to permit the application of a substantial force thereto.

After maintaining the pressure for a time period sufficient to cure the bonding material, the mold is placed in a pouring flask and the space between the mold and the flask is filled with sufficient sand to support the areas intermediate the pins during pouring. The amount of supporting sand is much less than the amounts of shot previously used because the clamping assembly produces most of the force necessary to maintain mold integrity. Molten metal then is poured into the mold and solidified. After solidification, the supporting sand is taken away, the clamping assembly is removed, and the shell mold is stripped from the casting.

Any bonding material or adhesive can be used to attach the shell halves to each other but best results are attained when the bonding material is the same as the binder mixed with the sand to form the molding material. The pin ends can be leveled in any manner; for example, a straight edge can strike off excess material as the partially cured shell half passes into the oven, or the pin ends can be ground after curing is completed. If desired, the pin ends can be contoured so the locus of the ends defines any configuration, and the surfaces of the clamping assembly then conform to that configuration. In place of pins, any projecting elements such as elongated ridges can be used.

If desired, the projecting elements can be used to transmit a clamping force only while the bonding material cures, and the molds can be supported during pouring in the conventional manner. Clamping forces sufficient to produce a pressure of about three p.s.i. at the contact surfaces of the shell halves have been used with great success when curing the bonding material. Such a clamping force tends to straighten irregularities produced in the shell halves by heat distortion, for example, thereby eliminating excess flash on the castings and insuring castings that are dimensionally accurate as cast. Higher or lower clamping forces can be used as desired in any stage of the processing with appropriate changes in shell thickness, pin size, pin location, and pin number.

Thus, shell molds having the projecting elements provided by this invention simplify the shell molding process by permitting cured shell portions to drop off mold patterns, thereby eliminating the necessity of lifting off the portions; permitting higher clamping forces while mold portions are being assembled into a shell mold, thereby improving the attachments and straightening minor irregularities; and by permitting clamping assemblies to apply most of the force necessary to maintain mold integrity during pouring, thereby reducing the amount of supporting material and allowing the use of less expensive supporting materials such as ordinary sand.

What is claimed is:

1. In a process for assembling a shell mold made from shell portions formed in a partially cured state by contacting treated sand with a heated pattern, the improvement comprising forming from the treated sand a plurality of projecting elements on the exterior surfaces of said shell portions, said projecting elements terminating above the highest protrusion of the shell portion, applying bonding material to one of said shell portions, placing the shell portions in contact with each other, and transmitting a force through the elements to produce a pressure on the contact surfaces while the bonding material is setting, said pressure being sufficient to straighten irregularities in the mold portions and to produce a dimensionally accurate casting.

2. The process of claim 1 comprising contacting the ends of the elements with a substantially planar surface prior to completely curing the shell portions to render the ends of the elements substantially coplanar.

3. The process of claim 2 in which the bonding material is the same as the binder used in the molding sand.

4. The process of claim 3 comprising placing the mold in a flask that applies a substantial clamping force through the projecting elements to the mold contact surfaces, filling the spaces between the mold exterior and the flask with supporting material, and pouring the mold.

5. The process of producing a dimensionally accurate as cast casting comprising forming a first mold portion by contacting a mixture of sand and a heat settable resin with a heated pattern, forming a second mold portion by also contacting a mixture of sand and heat settable resin with a heated pattern, at least one of said mold portions being characterized by the presence of a plurality of integral force receiving elements which elements are sufficiently robust in construction to permit the application of a substantial force thereto in a direction normal to the mold face, said elements terminating above the highest protrusion of the shell portion, applying an adhesive to at least one of said mold sections, assembling said first and second mold portions and applying sufficient force to the force receiving elements to insure an accurate and predetermined configuration of the mold cavity defined at least in part by the said first and second mold portions and pouring molten metal into said mold cavity.

6. The process of claim 1 comprising placing the mold in a flask that applies a substantial clamping force through the projecting elements to the mold contact surfaces, filling the spaces between the mold exterior and the flask with supporting material, and pouring the mold.

7. The process of claim 6, in which the space between the mold exterior and the flask is filled with molding sand.

8. The process of claim 7 in which the mold is placed vertically in the flask and the mold is poured from one longitudinal end.

References Cited

UNITED STATES PATENTS

| | | | |
|---|---|---|---|
| 2,825,106 | 3/1958 | Pfaff | 164—361 X |
| 2,751,650 | 6/1956 | Froberger | 164—21 |
| 2,789,331 | 4/1957 | Dietert | 164—27 |
| 2,832,112 | 4/1958 | Laurenz et al. | 164—29 |
| 2,923,988 | 2/1960 | Baker | 164—21 |

J. SPENCER OVERHOLSER, Primary Examiner

JOHN S. BROWN, Assistant Examiner

U.S. Cl. X.R.

164—29, 361